United States Patent
Moertelmaier et al.

(10) Patent No.: US 10,867,382 B2
(45) Date of Patent: Dec. 15, 2020

(54) DETECTING MURA DEFECTS IN MASTER PANEL OF FLAT PANEL DISPLAYS DURING FABRICATION

(71) Applicant: Keysight Technologies, Inc., Santa Rosa, CA (US)

(72) Inventors: Manuel Moertelmaier, Wels (AT); Tomonori Ura, Chofu (JP); Yosuke Komma, Tokyo (JP); Michael Dieudonne, Leuven (BE)

(73) Assignee: Keysight Technologies, Inc., Santa Rosa, CA (US)

( * ) Notice: Subject to any disclaimer, the term of this patent is extended or adjusted under 35 U.S.C. 154(b) by 75 days.

(21) Appl. No.: 16/368,989

(22) Filed: Mar. 29, 2019

(65) Prior Publication Data

US 2019/0362481 A1 Nov. 28, 2019

Related U.S. Application Data

(60) Provisional application No. 62/675,999, filed on May 24, 2018.

(51) Int. Cl.
*G06T 7/00* (2017.01)
*G06T 5/50* (2006.01)
(Continued)

(52) U.S. Cl.
CPC ......... *G06T 7/001* (2013.01); *G01N 21/8851* (2013.01); *G06F 3/14* (2013.01); *G06T 3/4038* (2013.01); *G06T 5/002* (2013.01); *G06T 5/20* (2013.01); *G06T 5/40* (2013.01); *G06T 5/50* (2013.01); *G06T 5/007* (2013.01);
(Continued)

(58) Field of Classification Search
None
See application file for complete search history.

(56) References Cited

U.S. PATENT DOCUMENTS 5,917,935 A * 6/1999 Hawthorne ........... G02F 1/1303
348/126
6,154,561 A * 11/2000 Pratt ....................... G06T 7/001
382/141

(Continued)

OTHER PUBLICATIONS

Hao-Chiang Shao et al., "Robust Segmentation for Automatic Detection of Mura Patterns", The 13th IEEE International Symposium on Consumer Electronics (ISCE2009), pp. 267-270.

*Primary Examiner* — Anand P Bhatnagar

(57) ABSTRACT

A method is provided for detecting mura defects in a master panel during fabrication, the master panel containing multiple flat screen displays. The method includes preparing a combined image from image data of the master panel; enhancing the quality of the combined image, including removing artifacts from the combined image; filtering the enhanced quality combined image to detect local mura defects, the local mura defects including at least one structured pattern of defined geometric shapes; applying different candidate patterns to the filtered combined image; selecting one of the candidate patterns as a defect detection pattern, the defect detection pattern being closest to the structured pattern of defined geometric shapes of the detected local mura defects; and displaying at least a portion of the defect detection pattern on a display, together with the quality-enhanced combined image.

20 Claims, 13 Drawing Sheets

(51) Int. Cl.
  *G06F 3/14*  (2006.01)
  *G06T 3/40*  (2006.01)
  *G06T 5/00*  (2006.01)
  *G06T 5/20*  (2006.01)
  *G01N 21/88*  (2006.01)
  *G06T 5/40*  (2006.01)
(52) U.S. Cl.
  CPC ............... *G06T 2207/20024* (2013.01); *G06T 2207/20076* (2013.01); *G06T 2207/20224* (2013.01); *G06T 2207/30121* (2013.01); *G06T 2207/30168* (2013.01)

(56) References Cited

U.S. PATENT DOCUMENTS

| | | | |
|---|---|---|---|
| 7,783,130 B2 | 8/2010 | Watson | |
| 8,145,008 B2* | 3/2012 | Chen | G06T 7/0004 382/275 |
| 8,743,215 B1* | 6/2014 | Lee | G09G 3/20 348/189 |
| 8,842,730 B2* | 9/2014 | Zhou | H04N 19/537 375/240.12 |
| 9,880,109 B2* | 1/2018 | Kim | G01N 21/956 |
| 10,643,576 B2* | 5/2020 | Lee | G09G 3/20 |
| 10,681,344 B2* | 6/2020 | Zhang | G06T 7/0004 |
| 2009/0274375 A1* | 11/2009 | Kavanau | G06T 5/002 382/224 |
| 2014/0072207 A1* | 3/2014 | Kavanau | G06T 5/002 382/159 |
| 2019/0035112 A1* | 1/2019 | Lee | G06T 7/90 |
| 2019/0189083 A1* | 6/2019 | Lee | G09G 5/10 |
| 2019/0197332 A1* | 6/2019 | Kavanau | G06K 9/6217 |
| 2019/0197678 A1* | 6/2019 | Lu | G06T 7/136 |

* cited by examiner

US 10,867,382 B2

DETECTING MURA DEFECTS IN MASTER PANEL OF FLAT PANEL DISPLAYS DURING FABRICATION

CROSS-REFERENCE TO RELATED APPLICATION

The present application claims priority under 35 U.S.C. § 119(e) to U.S. Provisional Application No. 62/675,999 filed on May 24, 2018. The entire disclosure of U.S. Provisional Application No. 62/675,999 is specifically incorporated herein by reference.

BACKGROUND

Flat panel displays, such as liquid crystal displays (LCDs), are used in many electronic devices, such as cellular phones, televisions, and computer monitors. They are typically fabricated by forming thin film transistor (TFT) arrays on a master panel (or substrate), where the TFT arrays correspond to multiple flat panel displays, and ultimately separating the master panel into individual flat panel displays. In a production line, a large number of master panels are processed daily.

The flat panel displays are manufactured in multiple process steps. In each step, chemical and mechanical surface modifications occur, some of which are considered defects, including mura defects. To ensure product quality (panel yield), the surface of the master panel must be inspected repeatedly between process steps, e.g., on a pixel-per-pixel basis. The inspection may be performed using an inspection system, such as a Keysight 88000 HS-100 Series Array Test System, for example, available from Keysight Technologies, Inc. The inspection produces data in the form of matrices corresponding to the pixels on the master panel. The data matrices typically include noise from multiple sources, both within the environment and the inspection hardware. The noise should be suppressed in order to give a clear picture of the measurement data to the user, and to allow automated detection of panel defects.

Mura defects, in particular, may appear in the master panel prior to separation of the individual flat panel displays. In the case of LCDs, for example, mura type defects are generally caused by process flaws related to cell assembly, which affect the transmission of light through the flat panel displays and are generally objectionable to viewers. Inspection systems may be put in place to provide measurements of the flat panel displays that yield information regarding defects, which may be introduced at individual manufacturing steps. For example, the Keysight 88000 HS-100 Series Array Test System produces single-pixel resolution charge maps of the flat panel displays, which may be used to identify defects. Given large datasets, certain defect patterns can be attributed to specific production equipment. However, the resulting giga-pixel datasets pose a challenge to visual inspection and annotation. Accordingly, what is needed is an efficient automated system and method for detecting, classifying and quantifying certain defect types, including mura defects, e.g., based on Fourier transforms. Automated detection and quality control reduces labor cost, and results in greater standardization.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
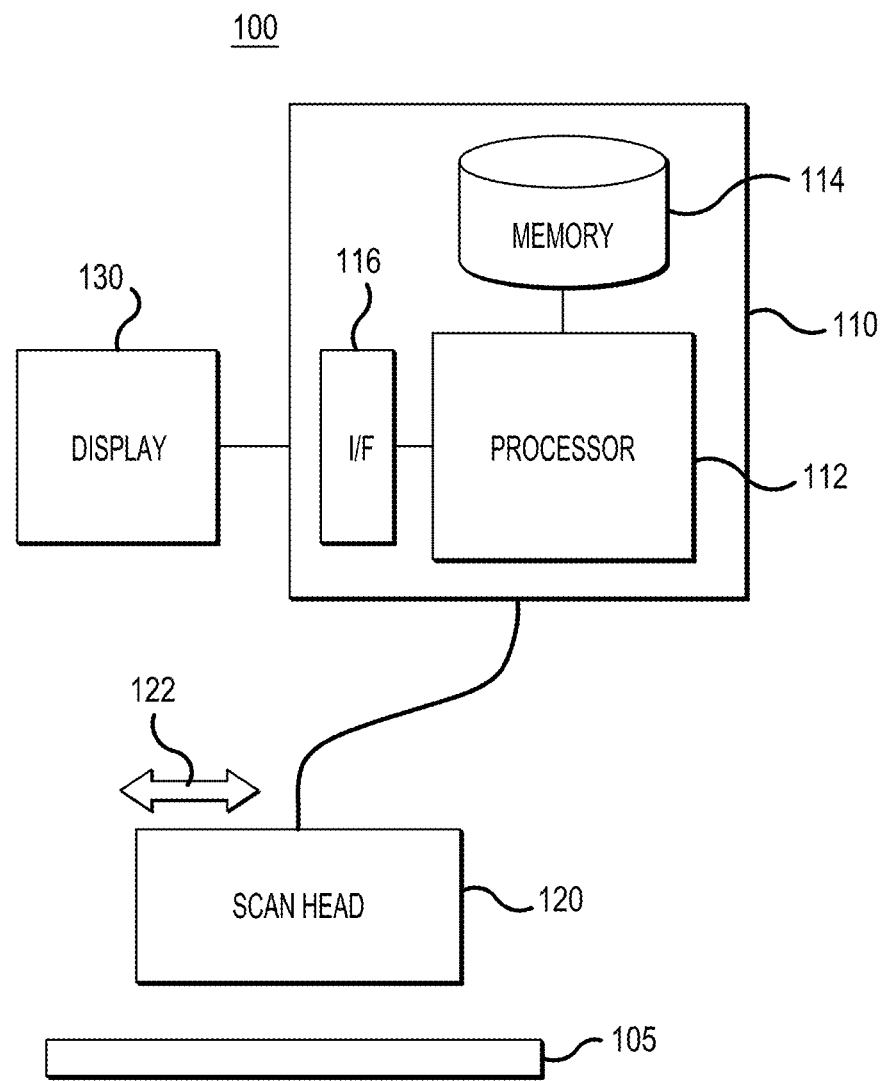
FIG. 1 is a simplified block diagram of a defect detection system for detecting mura defects in a master panel including multiple flat panel displays during fabrication, according to a representative embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements" relationships to one another, as illustrated in the accompanying drawings. These relative terms are intended to encompass different orientations of the elements thereof in addition to the orientation depicted in the drawings. For example, if an apparatus depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Generally, according to a representative embodiment, a method is provided for detecting mura defects in a master panel during fabrication, where the master panel contains multiple flat screen displays. The method includes preparing a combined image from image data of the master panel; enhancing the quality of the combined image, including removing artifacts from the combined image; filtering the enhanced quality combined image to detect local mura defects, including the local mura defects having at least one structured pattern of defined geometric shapes; applying different candidate patterns to the filtered combined image; selecting one of the different candidate patterns as a defect detection pattern, which is the defect detection pattern closest to the structured pattern of defined geometric shapes of the detected local mura defects; and displaying at least a portion of the defect detection pattern on a display, together with the quality-enhanced combined image, to show the positions of the detected local mura defects in the structured pattern of defined geometric shapes. The filtering of the enhanced quality combined image to detect local mura defects may include filtering out relevant spatial frequencies corresponding to the length scales of the detected local mura defects to provide a first filtered image, and convoluting the first filtered image with a set of templates corresponding to the defined geometric shapes, respectively.

FIG. 1 is a simplified block diagram of a defect detection system for detecting mura defects in a master panel including multiple flat panel displays during fabrication, according to a representative embodiment.

Referring to FIG. 1 defect detection system 100 includes controller 110 that controls operation of scan head 120, and processes image data provided by the scan head 120. The image processing includes detection of mura defects according to the methods set forth in FIGS. 2A and 2B, for example. The controller 110 includes processor 112, memory 114 and interface (I/F) 116. The defect detection system 100 further includes display 130 for displaying images and results of data/image processing provided by the processor 112 via the I/F 116 (which includes a display interface). The display 130 may incorporate a graphical user interface (GUI), by which a user may interact with the controller 110, using displayed information on the display 130 together with user input devices (not shown), such as a keyboard, a mouse, a touch pad and/or a touch-sensitive screen. Any other compatible means of providing input and receiving output information may be incorporated in the defect detection system 100, without departing from the scope of the present teachings.

The scan head 120 may include different types of scanning devices, without departing from the scope of the present teachings, to collect data from a master panel 105 being scanned in order to provide corresponding image data. For example, the scan head 120 may be an electrical contact scanner that collects data by making electrical contact with the master panel 105. Address and data signals indicative of a top surface of the master panel 105 are conveyed through metal probes of the head. More particularly, electrical signals from the scan head 120 connect to pixels on the master panel 105, respectively, in a predetermined sequence to provide pixel signals (the image data). The scan head 120 also may be an optical contact scanner that functions in a similar manner as the electrical optical scanner. In alternative configurations, the scan head 120 may provide data through non-contact scanning methods, including use of camera(s), scanning sensors (such as charge-coupled devices (CCDs)), or laser excitation, for example, that provide data indicative of the master panel 105 being scanned. Also, in alternative configurations, the scan head 120 may include a laser source, a lens and electrical contacts through probe needles for exciting photoconductive current in TFT cells of the master panel 105 to be analyzed through an electrical contact terminal, which may be part of the scan head 120.

The master panel 105 includes pixels that are arranged in arrays that correspond to flat panel displays. As mentioned above, the scan head 120 may electrically connect to the pixels on the master panel 105 in order to obtain image data. In an embodiment, the scan head 120 is mobile, and may be moved substantially parallel to the master panel 105, as indicated by arrow 122. This enables the scan head 120 to obtain image data from different portions of the master panel 105, to the extent the master panel 105 is larger than the scan area of the scan head 120. Movement of the scan head 120 may be performed manually, or may be automated under control of the controller 110. The scan head 120 may be used to scan the entire master panel 105, or any portion(s) thereof. For example, the scanning by the scan head 120 and the mura detection by the controller 110 may be performed on selected and/or randomly identified portions of the master panel 105 to sample the presence and nature of mura defects without scanning the entire master panel 105.

The processor 112 of the controller 110 is programmed to perform the defect detection process, according to the various embodiments, such as the method steps described with reference to FIGS. 2A and 2B, below. The processor 112 may also be programmed to perform quality assurance on the master panel 105 and/or the flat panel displays following defect detection of the presence and extent of mura defects, discussed below. The processor 112 may be implemented by one or more computer processors, application specific integrated circuits (ASICs), field-programmable gate arrays (FPGAs), or combinations thereof, using software, firmware, hard-wired logic circuits, or combinations thereof. In an embodiment, the processor 112 may be a digital signal processor (DSP), for example. A computer processor, in particular, may be constructed of any combination of hardware, firmware or software architectures, and may include its own memory (e.g., nonvolatile memory) for storing executable software/firmware executable code that allows it to perform the various functions. In an embodiment, the computer processor may comprise a central processing unit (CPU), for example, executing an operating system.

The memory 114 stores at least a portion of the image data obtained using the scan head 120, and processing results from the processor 112. The memory 114 may also be a database for storing various types of templates, structured patterns of the defined geometric shapes, and candidate patterns for potential defect detection patterns to be applied by the processor 112 in processing image data and identifying mura defects, as discussed below. The memory 114 may be implemented by any number, type and combination of random access memory (RAM) and read-only memory (ROM), for example, and may store various types of information, such as computer programs and software algorithms executable by the processor 112 (and/or other components), as well as image data and/or testing and measurement data storage, and templates and patterns (discussed above), for example. The various types of ROM and RAM may include any number, type and combination of computer readable storage media, such as a disk drive, disk storage, an electrically programmable read-only memory (EPROM), an electrically erasable and programmable read only memory (EEPROM), a CD, a DVD, a universal serial bus (USB) drive, and the like, which are tangible and non-transitory storage media (e.g., as compared to transitory propagating signals).

Figure 2A:
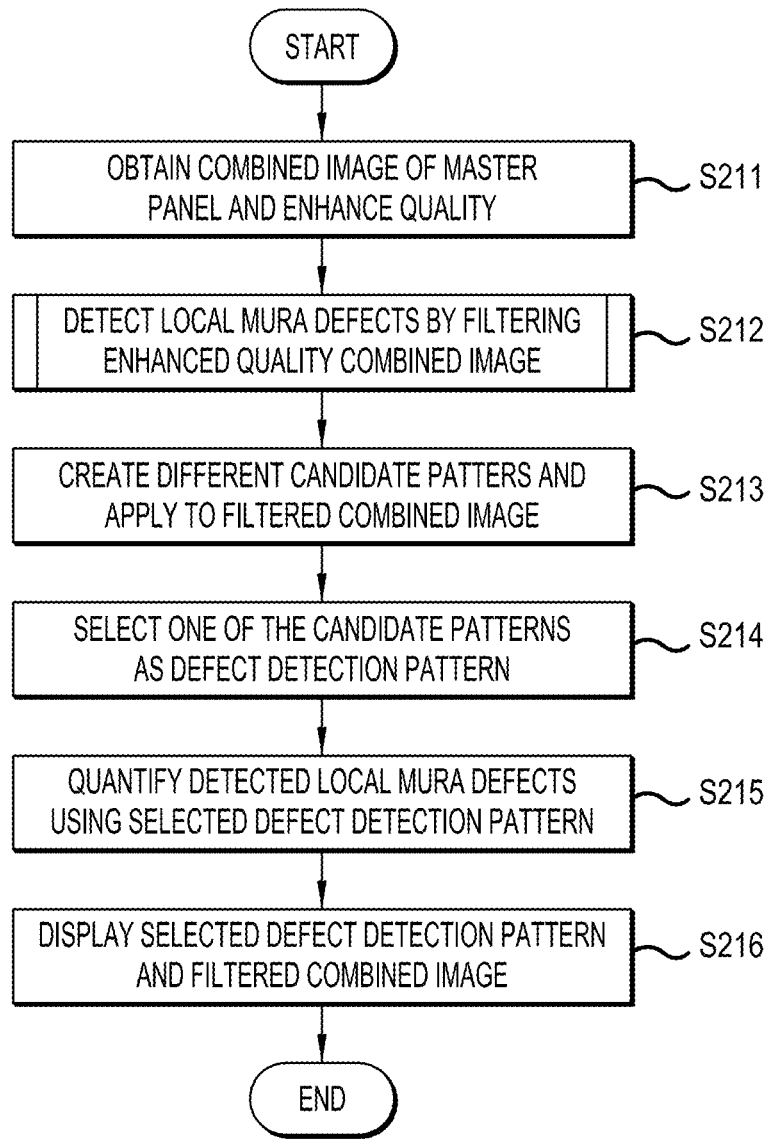
FIG. 2A is a flow diagram showing an automated method of detecting mura defects in a master panel during fabrication, according to a representative embodiment.

FIG. 2A is a flow diagram showing an automated method of detecting mura defects in a master panel during fabrication, according to a representative embodiment.

Referring to FIG. 2A, a combined image of the master panel (e.g., master panel 105) is obtained in block S211, where the master panel may be a glass substrate (e.g., mother glass substrate (MGS)), for example, containing multiple flat panel displays, although the master panel may be a substrate comprising other material(s) without departing from the scope of the present teachings. Obtaining the combined image may include, for example, scanning the master panel using a scan head (e.g., scan head 120) to obtain multiple images of portions of the master panel, respectively. The scan head includes one or more imaging devices that obtain the image data of the master panel as it passes through the defect detection system during the manufacturing process. In an embodiment, the images include pixel signals received from a matrix of pixels on the master panel in response to the scanning. That is, scanning signals from the scan head may connect to pixels on the master panel, respectively, in a predetermined sequence to provide pixel signals for obtaining the multiple images. The multiple images include corresponding image data, at least a portion of which may be stored in memory (e.g., memory 114).

Figure 3:
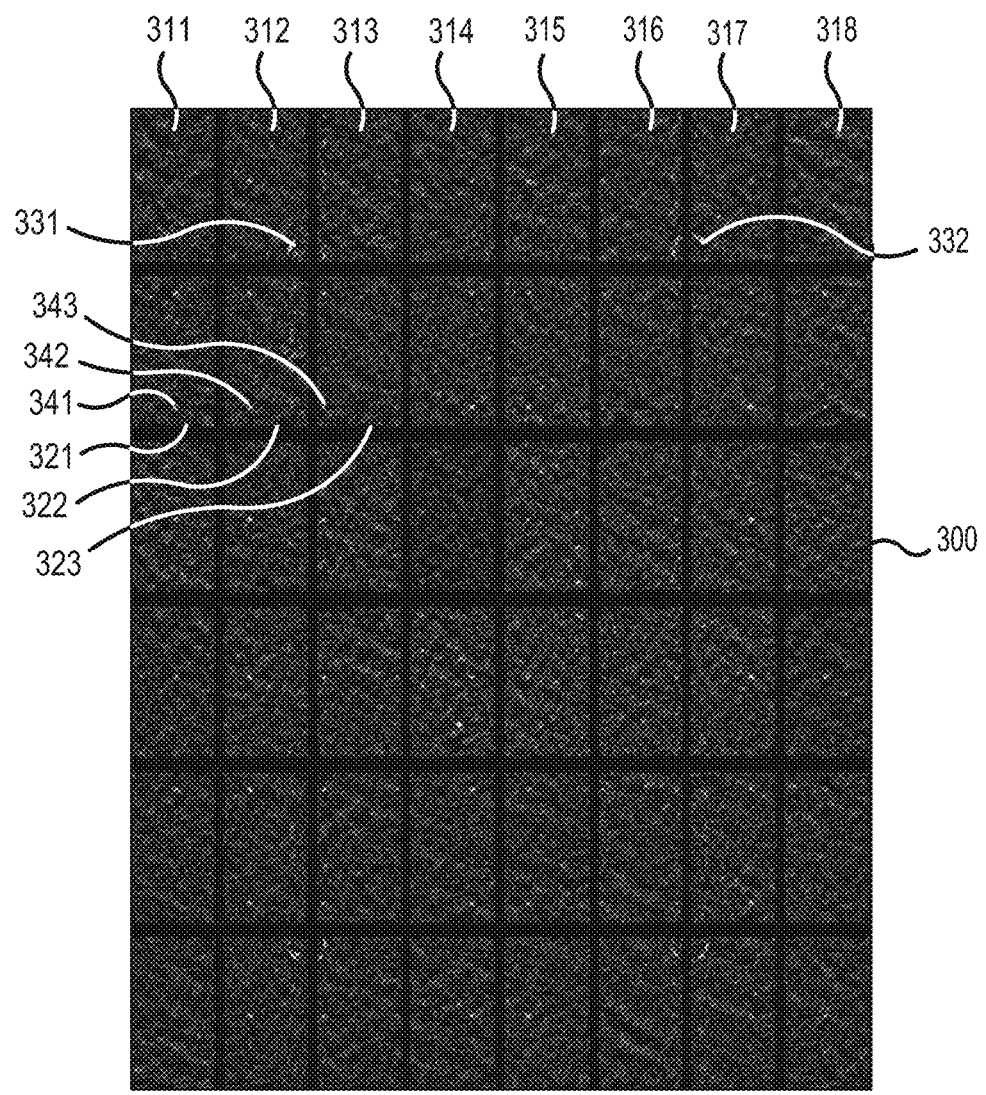
FIG. 3 is a screen shot of an illustrative combined image, obtained according to a representative embodiment.

FIG. 3 is a screen shot of an illustrative combined image, obtained according to a representative embodiment. Referring to FIG. 3, combined image 300 of the master panel may be larger than 10,000×10,000 pixels, for example. As shown the combined image 300 includes images of multiple flat panel displays, which have not yet been separated from the master panel in the course of the fabrication process. The combined image of the master panel has had artifacts removed or suppressed, and has been flattened, as discussed below. The images of the flat panel displays are indicated by an 8×6 array of rectangles, although the number of flat panel display images per combined image may vary, without departing from the scope of the present teachings. For the sake of convenience, only the first row and a portion of the second row of the combined image has been labeled: the first row including flat panel display images 311 to 318 and the second row including flat panel display images 321 to 323. The combined image 300 also shows examples of mura defects, such as ring mura defects 331 and 332 of a ring array partially shown in flat panel display images 312, 313 and 316, 317 (although rings of the ring array appear in other flat panel display images, as well). The rings may be vestiges of suction cups used to secure the master panel during fabrication process. Another example of mura defects is a spot array including representative spot mura defects 341, 342 and 343 in corresponding flat panel display images 321, 322 and 323, respectively (although not labeled, additional spot mura defects of the spot array appear in other flat panel display images, as well). The spot mura defects may result from handling equipment used to manipulate and/or move the master panel, for example.

Combining the image data (e.g., stored in memory 114) of the multiple images to provide the combined image may include down-sampling the multiple images to reduce storage requirements for storing the image data, removing measurement artifacts, arranging the down-sampled images in a two-dimensional pattern, combining the two-dimensional pattern into a single larger image, suppressing processing artifacts, and correcting the down-sampled images of the single larger image for contrast and background level to provide the combined image of the master panel. The combined image thus appears homogeneous. Regions of the combined image consisting of actual data (as opposed to unknown regions) may be marked in a separate binary matrix. The binary matrix regions are used to weigh filter responses from filtering the combined image, e.g., discussed with regard to block S213 below.

The removal and suppression of artifacts enhance the quality of the combined image by cleaning up the image data before and after combining the image data into the single larger image. For example, assuming the scan head 120 is an electrical contact scanner, as discussed above, removing the measurement artifacts from the image data in individual frames (flat panel display images) before combining the two-dimensional pattern into the single, larger image may include removing noise originating from electronic amplifier components, removing white noise using a low-pass filter, locally flattening the image and suppressing purely vertical and purely horizontal spatial frequencies. Removing the noise originating from electronic amplifier components may include removing drift by subtraction of a gliding average, removing changes in gain by normalizing signal strength, removing crosstalk between amplifier channels, and removing narrowband noise by applying narrowband spatial frequency filters. Removing measurement artifacts may further include removing lines caused by laser annealing, for example, and other manufacturing processes. Suppressing artifacts after combining the two-dimensional pattern into the single larger image may include removing overshoot and undershoot of signals, e.g., in corners of the stored image data of the individual frames, by the local flattening of the image signals, for example, and is performed before correcting for contrast and background level.

Figure 4:
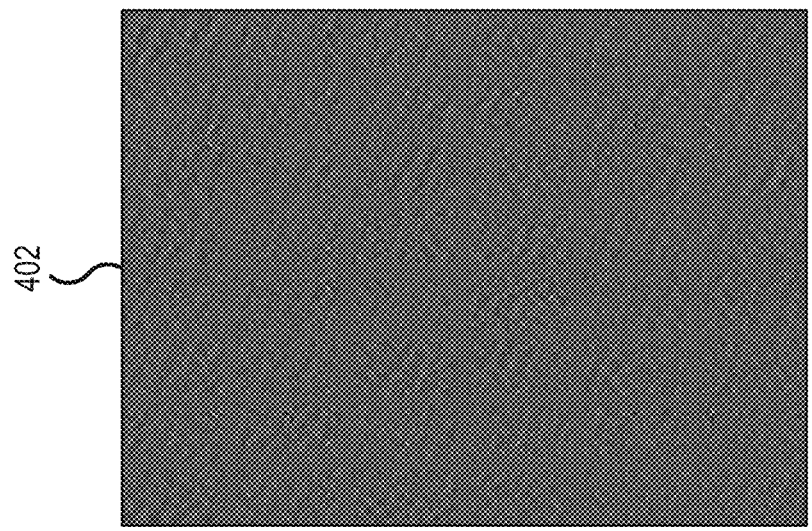
FIG. 4 shows screen shots of an illustrative combined image, before and after down-sampling, cleaning and arranging the image data, according to a representative embodiment.
Figure 4:
Figure 4:
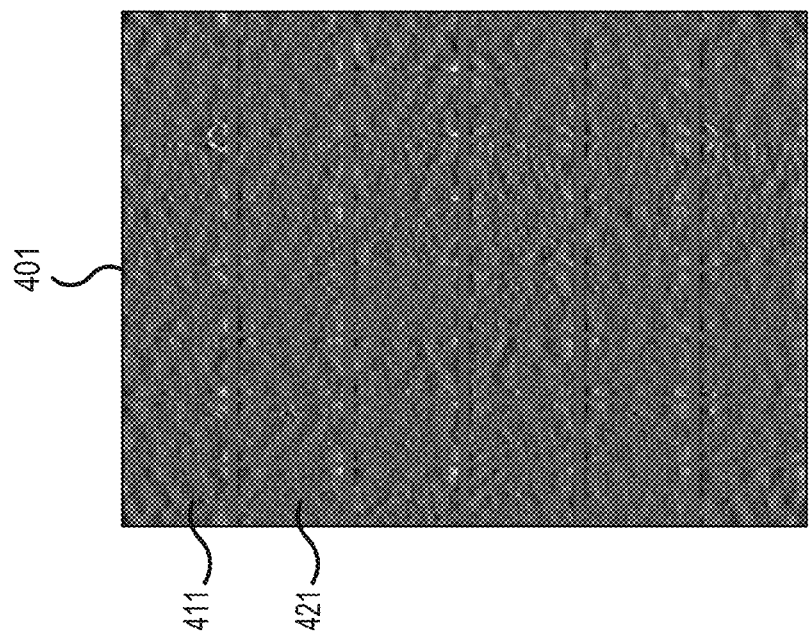

FIG. 4 shows screen shots of an illustrative combined image, before and after down-sampling, cleaning and arranging the image data, according to a representative embodiment. Comparing mother board image 401 and combined image 402, it is apparent that the combined image 402 is flattened. Also, the overshoot and undershoot of signals, appearing as bright spots in some of the corners of the individual flat panel display images in the mother board image 401 (such as representative bright spots 411 and 421), do not appear in the enhanced quality combined image 402.

In block S212, local mura defects are detected by filtering the enhanced quality combined image. FIG. 2B is a flow diagram showing an automated method of filtering the enhanced quality combined image for detecting the local mura defects, as indicated by block S212, according to a representative embodiment. Variations of the method of filtering the enhanced quality combined image may be incorporated without departing from the scope of the present teachings.

The detected local mura defects include at least one structured pattern of corresponding defined geometric shapes. For example, the structured pattern of defined geometric shapes may include structured patterns of rings and/or spots on the enhanced quality combined image, such as representative ring mura defects 331 and 332 and representative spot mura defects 341, 342 and 343 in FIG. 3. Accordingly, filtering the enhanced quality combined image to detect local mura defects may include using defect pattern specific templates for detecting the structured patterns of the defined geometric shapes. Generally, filtering the enhanced quality combined image may include extracting relevant spatial frequencies corresponding to length scales (e.g., feature lengths) of the local mura defects to provide a first filtered image, and then convoluting the first filtered image with a set of defect pattern specific templates corresponding to the defined geometric shapes (e.g., ring and spot mura defects), respectively.

Figure 2B:
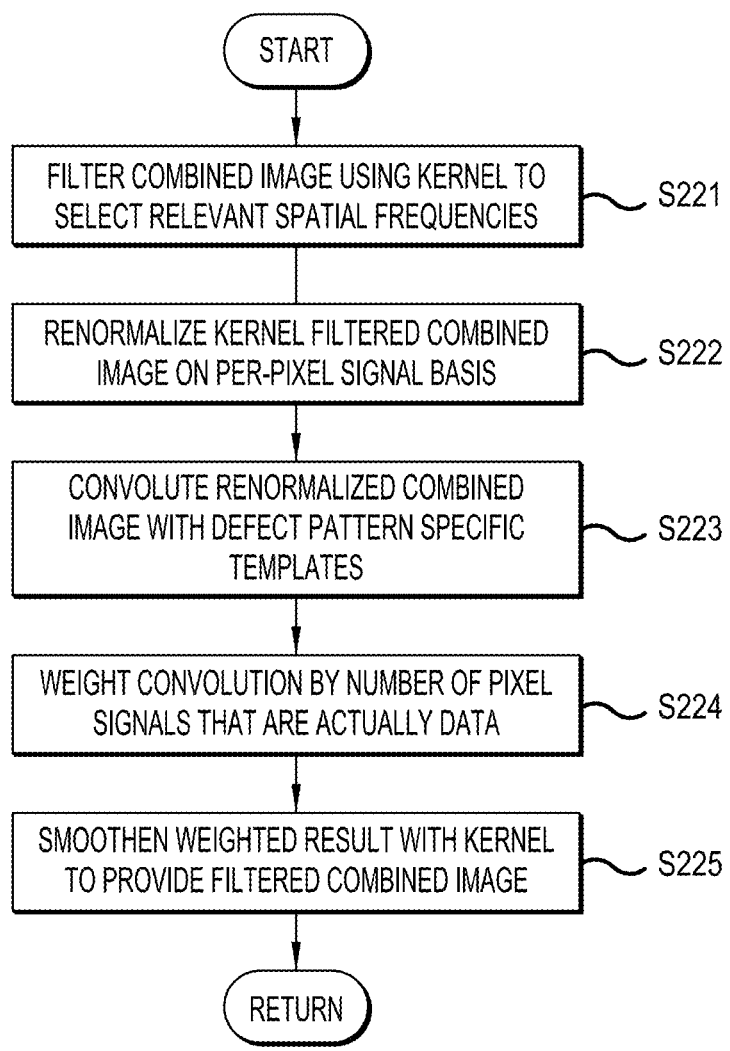
FIG. 2B is a flow diagram showing an automated method of filtering a master panel image for detecting mura defects in the master panel during fabrication, according to a representative embodiment.

FIG. 2B depicts an illustrative process indicated by block S212 of FIG. 2A for filtering the enhanced quality combined image. Referring to FIG. 2B, according to an embodiment, the enhanced quality combined image from block S211 is filtered using a kernel that selects (or extracts) relevant spatial frequencies to compile a histogram of the kernel filtered combined image in block S221, and the filtered combined image is renormalized on a per-pixel signal basis in block S222 as a probability of not being random noise by comparing pixel signals of the filtered combined image, at least in part, to the histogram. The histogram may include an empirical histogram fitted with a Gaussian distribution, where a difference between the empirical histogram and the Gaussian fit is large for strong signals. The probability of a pixel being background (random noise) is calculated by comparing the corresponding pixel signal to both the empirical histogram and the Gaussian fit. The kernel for extraction of the relevant spatial frequencies may include a simple Gaussian function with width based on visual inspection of the predetermined feature length scale. The selected relevant spatial frequencies may be down-sampled to reduce processing time, e.g., if time is a limiting factor. The irrelevant spatial frequencies (e.g., too high, too low) may be discarded.

Figure 5:
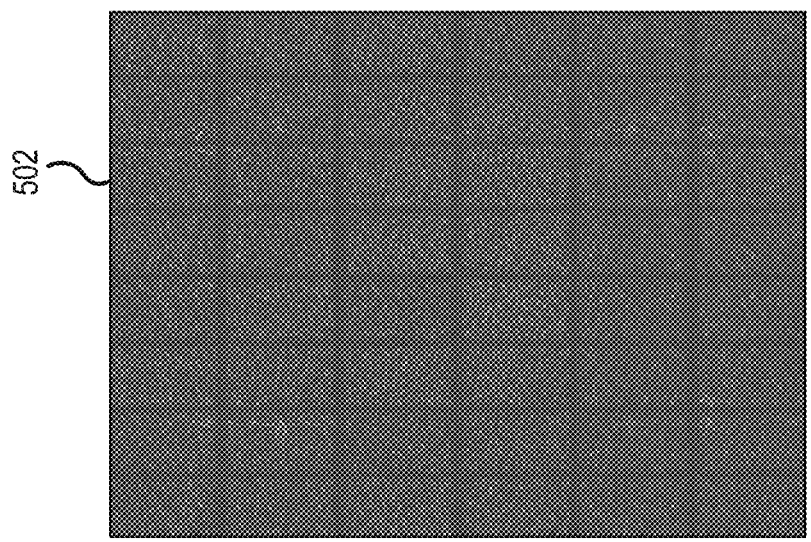
FIG. 5 shows screen shots of illustrative combined images, before and after filtering with a kernel, according to a representative embodiment.
Figure 5:
Figure 5:
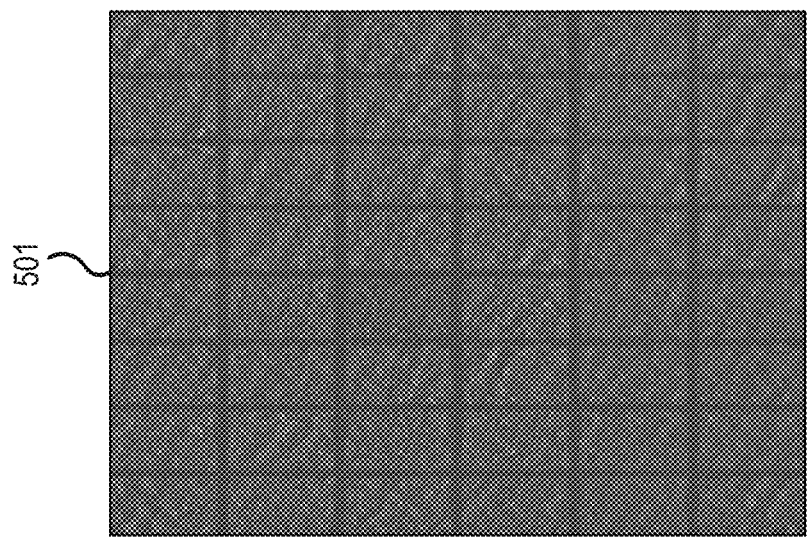

FIG. 5 shows screen shots of illustrative combined images, before and after filtering with a kernel, according to a representative embodiment. Comparing enhanced quality combined image 501 and kernel filtered combined image 502, it is apparent that frequencies characteristic of signals of interest have been emphasized. This is shown by the enhanced contrast of the mura defects and similar signals with reference to the background of the kernel filtered combined image 502. Also, high spatial frequencies have been discarded by filtering with the kernel, as mentioned above, indicated by the scales of the vertical and horizontal axes of the combined images 501 and 502. That is, the vertical and horizontal axes are shorter because image resolution has been decreased. The high frequencies were rejected, and the remaining low frequencies can be equally well represented by larger, hence, fewer pixels. For reasons of efficiency, the image is thus downscaled. The combined image 501 may correspond to the flattened combined image 402 in FIG. 4, discussed above.

Figure 6:
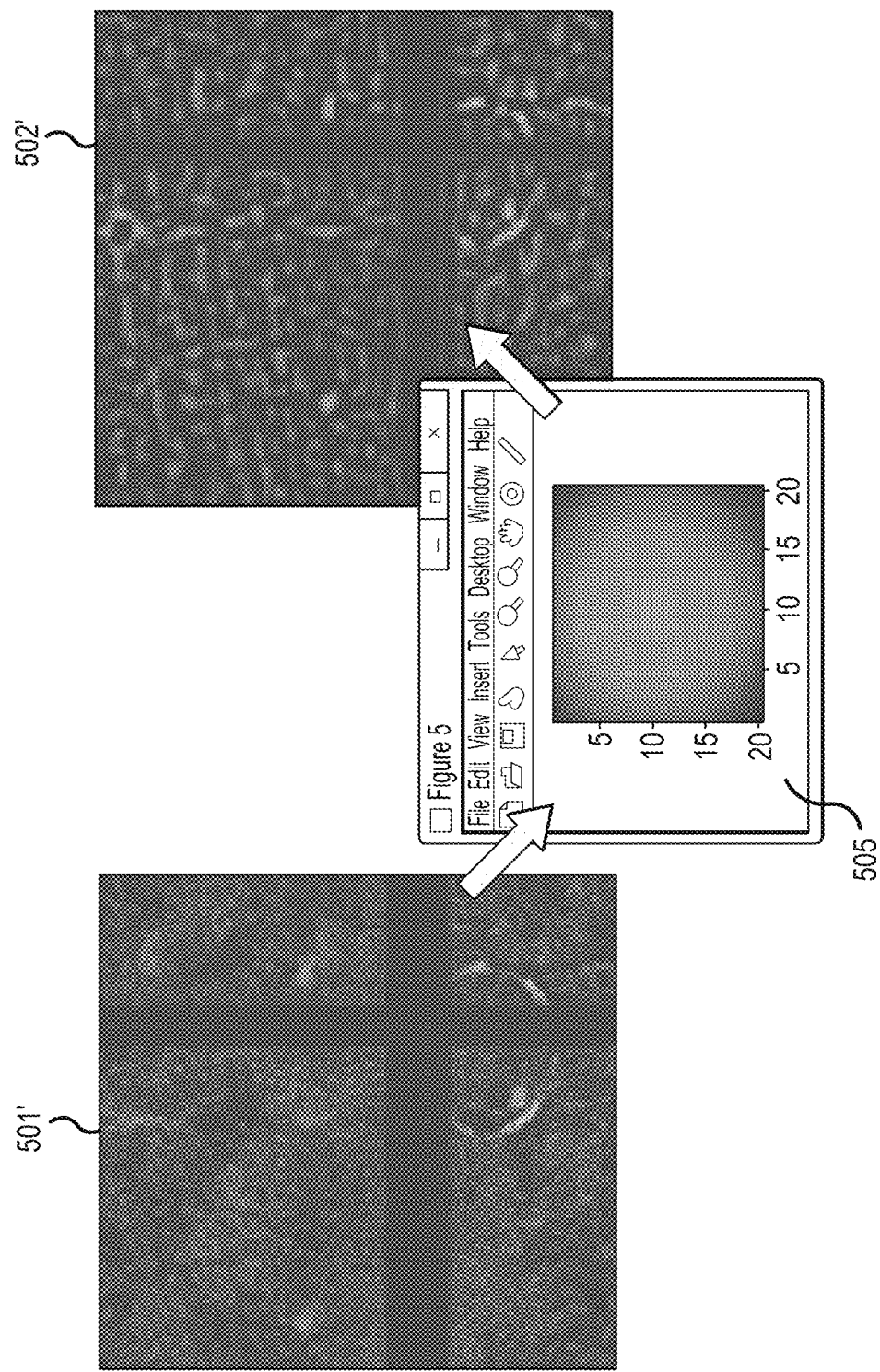
FIG. 6 shows zoomed-in portions of the screen shots of the illustrative combined images in FIG. 5, before and after filtering with a kernel, according to a representative embodiment.

FIG. 6 shows zoomed-in portions of the screen shots of the illustrative combined images in FIG. 5, before and after filtering with a kernel, according to a representative embodiment. Each of the zoomed-in portions 501' and 502' corresponds to the location of a ring mura defect 530 of the enhanced quality combined image 501 and the kernel filtered combined image 502, respectively. The ring mura defect 530 may correspond to one of the ring mura defects 331 or 332 in FIG. 3, for purposes of explanation. A Gauss filter 505 is also shown indicating the kernel filtering performed on the combined image 501. The structures of interest in the depicted example have a "line width" of about 10-20 pixels. Therefore, a filter width of the Gauss filter 505 is selected to have a similar size for convolution (e.g., 20×20 pixels), although other similar filter widths may be incorporated without departing from the scope of the present teachings. Comparing the zoomed-in portions 501' and 502' of the enhanced quality combined image 501 and the kernel filtered combined image 502, it can be seen that signals from neighboring pixels are combined and averaged. This prevents individual pixels from having undue influence on subsequent steps in the mura defect detection process. It is assumed that there is substantial random background response from the feature detection, and a small region where there is an actual signal. The absolute strength of the signal is not as important as whether the signal is considered to be genuine, as opposed to stemming from particularly large background variations.

Figure 7:
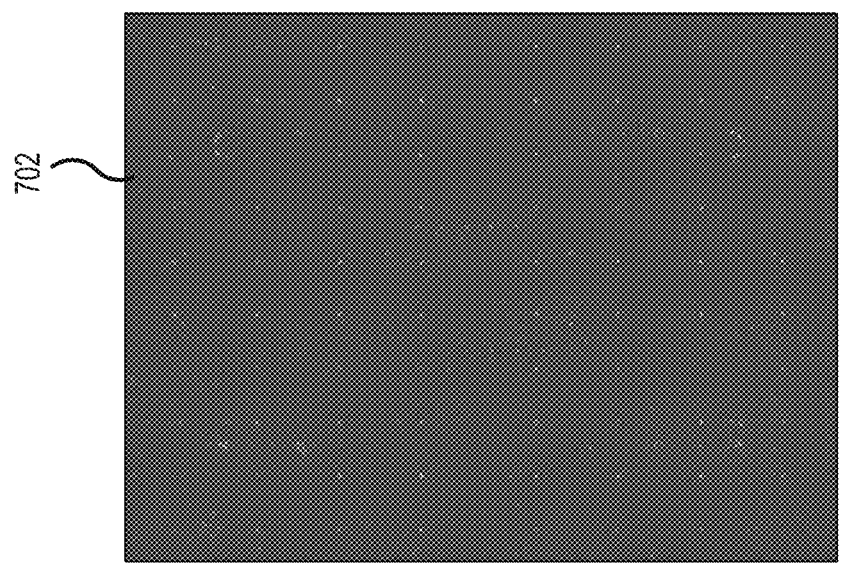
FIG. 7 shows screen shots of illustrative combined images, before and after renormalizing the kernel filtered combined image, according to a representative embodiment.
Figure 7:
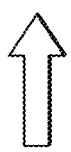
Figure 7:
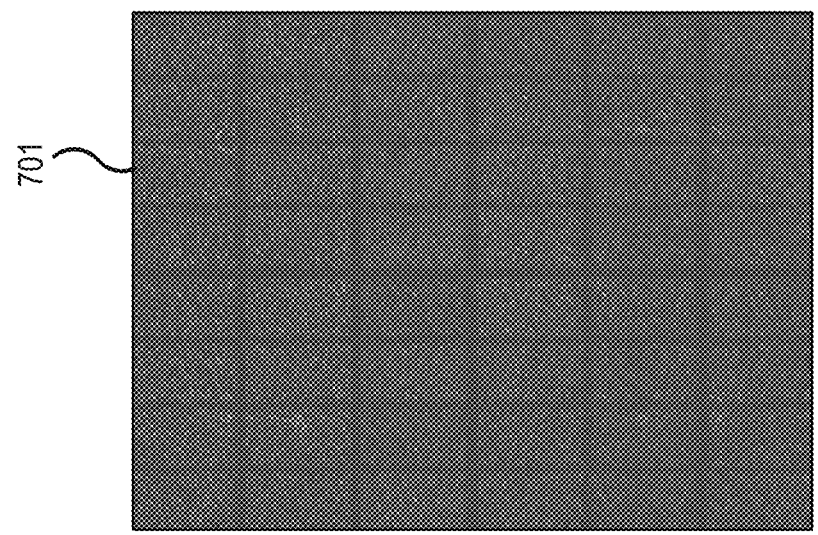

FIG. 7 shows screen shots of illustrative combined images, before and after renormalizing the kernel filtered combined image in block S222, according to a representative embodiment. The kernel filtered combined image 701 shows a significant amount of variation in signal, indicated by the spots throughout the combined image. As shown, signal strengths of background fluctuations approach real signal strengths, making detection of real signals more difficult. However, in comparison, the renormalized combined image 702 cuts out background signals, and sets the real signals to a uniform signal strength. This is shown by the potential mura defects (bright areas) in sharp contrast with the substantially uniform and homogenous background of the renormalized combined image 702. Notably, the kernel filtered combined image 701 in FIG. 7 may correspond to the kernel filtered combined image 502 in FIG. 5, discussed above. Also, the renormalized combined image 702 may be the first filtered image, mentioned above.

Next, in block S223, filtering the enhanced quality combined image to detect the local mura defects includes convoluting the renormalized combined image (the first filtered image) with the set of the defect pattern specific templates corresponding to the defined geometric shapes (e.g., rings and spots), respectively, to identify the defect patterns in the renormalized filtered combined image. The defect patterns do not have to match shape and/or size of the templates exactly, and multiple iterations may be performed, if necessary. In block S224, the result of convoluting the renormalized combined image and the set of defect pattern specific templates is weighted by the number of pixel signals that are actually data, as opposed to the pixel signals of zero corresponding to pixels in regions where no image data was acquired. The weighted result is smoothened with the kernel in block S225 to provide a filtered combined image. The smoothening includes penalizing isolated signals and enforcing signals that match a predetermined feature length scale, e.g., penalizing longer and shorter feature lengths.

Figure 8:
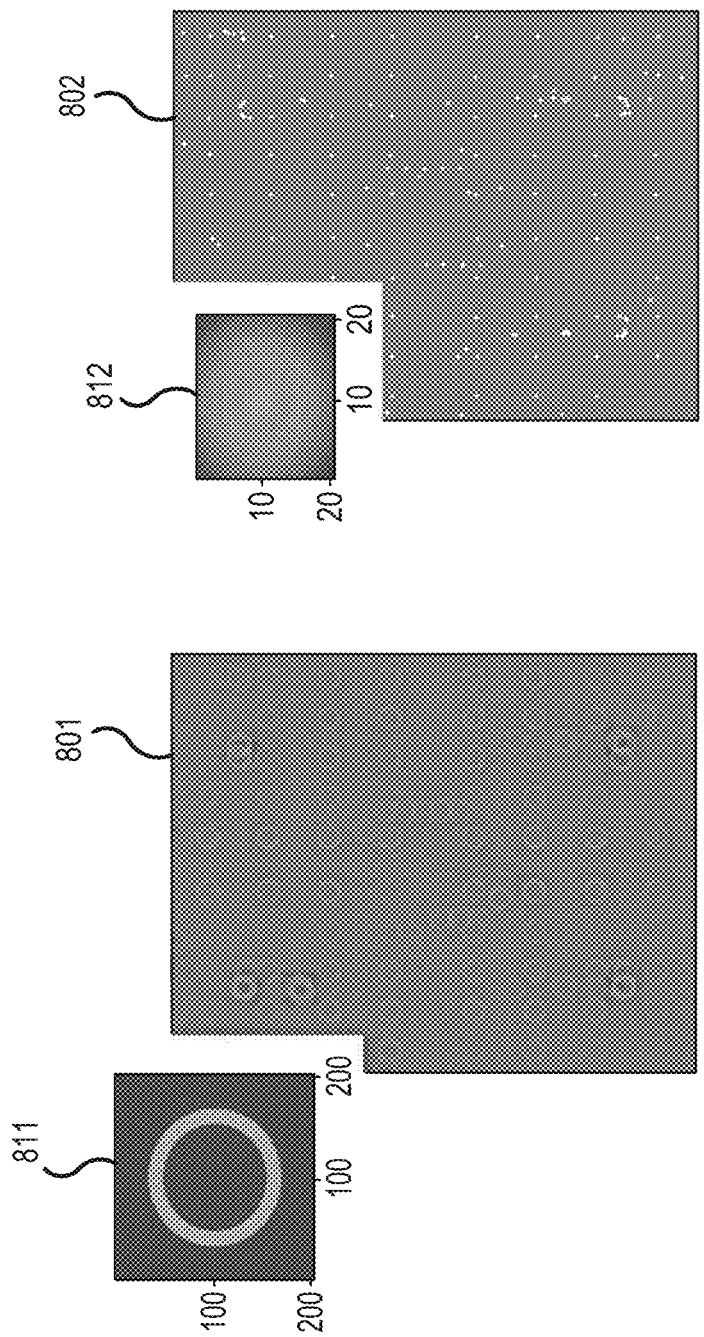
FIG. 8 shows screen shots of illustrative renormalized combined images convoluted with defect pattern specific templates, according to a representative embodiment.

FIG. 8 shows screen shots of illustrative renormalized combined images convoluted with defect pattern specific templates, according to a representative embodiment. Referring to FIG. 8, the convoluted image 801 shows convolution using templates corresponding to ring mura defects, such as illustrative ring template 811. The convoluted image 802 shows convolution using templates corresponding to spot mura defects, such as illustrative spot template 812. The ring and spot templates 811 and 812 may be implemented as software algorithms or applets, for example. In the depicted embodiment, the ring mura defects are significantly larger than the spot mura defects, for example, the ring template 811 may be 200×200 pixels and the spot template may be only 20×20 pixels, for example, although other sizes and relative sizes may be incorporated without departing from the scope of the present teachings. Of course, multiple ring and/or spot templates may be used if there is uncertainty regarding sizes and aspect ratios of the ring mura defects and/or the spot mura defects. Also, the various embodiments are not limited to ring mura defects and spot mura defects. That is, templates may created, as needed, for any variety shapes that are expected to appear as mura defects in the renormalized combined image.

The convolution performed in block S223 detects cross-correlation between the ring template 811 and each of the potential mura defects, and cross-correlation between the spot template 812 and each of the potential mura defects, in the renormalized combined image 702 of FIG. 7. Where cross-correlation indicates sufficient similarity in shape, initial patterns of mura defects are detected. As mentioned above, the convolution results are weighted by the number of pixel signals that are actually data, and the weighted results are smoothened with the kernel to provide the filtered combined image including the detected patterns of ring and spot mura defects. The smoothening effectively penalizes isolated signals (e.g., spurious responses) and enforces signals that match the relevant length scale.

Figure 9:
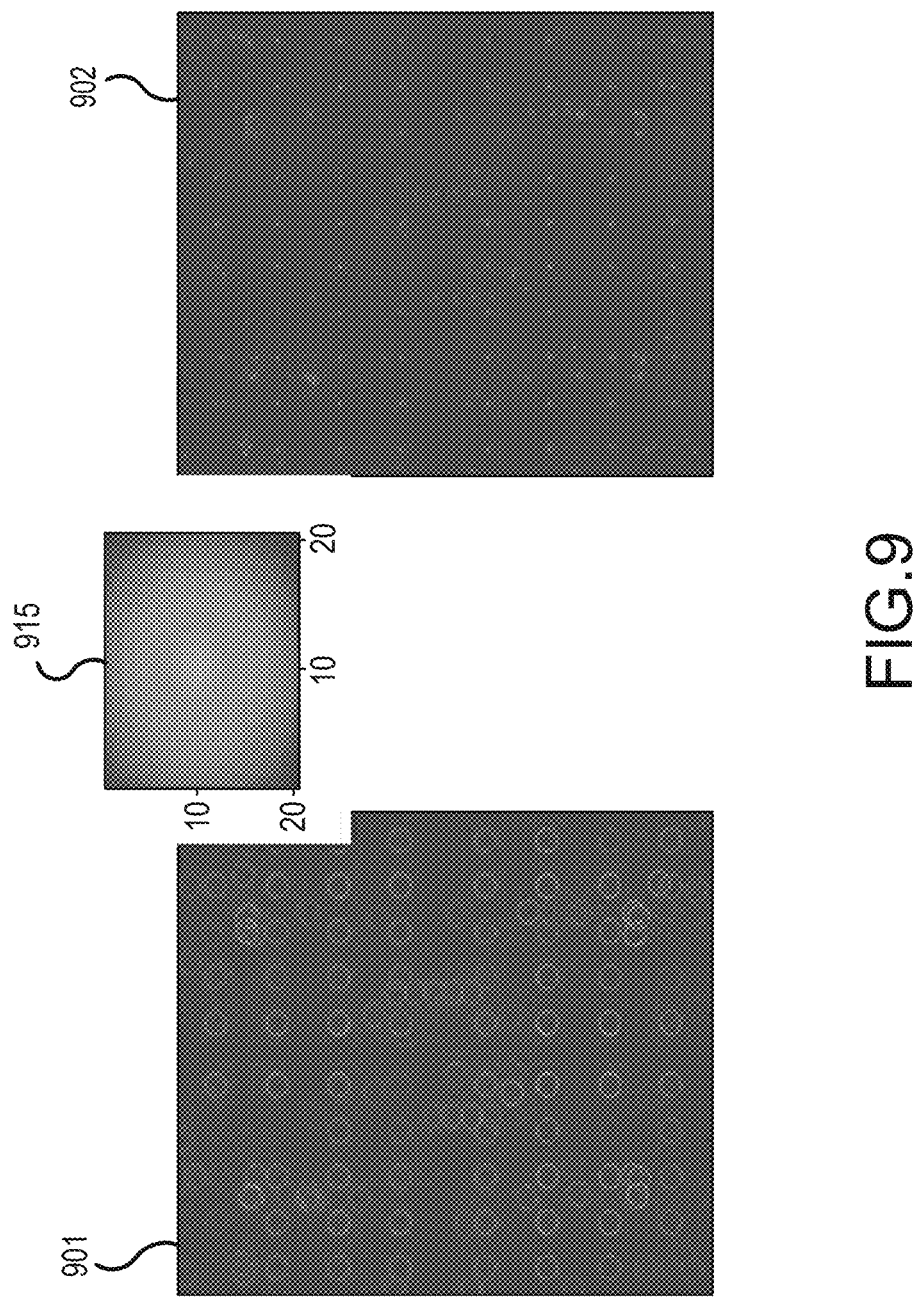
FIG. 9 shows screen shots of illustrative smoothened, filtered combined images showing the mura defect templates, according to a representative embodiment.

FIG. 9 shows screen shots of illustrative smoothened, filtered combined images showing the mura defect templates, according to a representative embodiment. In particular, combined image 901 shows templates corresponding to ring mura defects, and combined image 902 shows templates corresponding to spot mura defects. As discussed above with reference to block S225 in FIG. 2B, the smoothening includes penalizing isolated signals and enforcing (or enhancing) signals that match a predetermined feature length scale, such as illustrative feature length scale 915 shown in FIG. 9. The feature length scale 915 is slightly less than the spot template 812, for example, so that the spot mura defects are enhanced, as well as the ring mura defects, while signals with different feature lengths are not enhanced (at least not to the same extent).

Referring again to FIG. 2A, in block S213, different candidate patterns are created and applied to the filtered combined image. The candidate patterns have differently dimensioned two-dimensional coordinate systems, respectively, that attempt to illustrate positioning of detected local mura defects. Each of the candidate patterns may include horizontal and vertical periodicity of the detected local mura defects, as well as horizontal and vertical positioning, thereby creating a rectangular pattern. Of course, patterns having shapes other than a rectangle may be incorporated, e.g., depending on the shape of the substrate and/or the shape of the scan head, without departing from the scope of the present teachings. For example, the candidate patterns may be circular or hexagonal. The horizontal and vertical positioning of each of the candidate patterns is varied, e.g., according to a search algorithm, which may be referred to as scan offset. That is, scan offset corresponds to the positioning of the candidate pattern with regard to the position of the individual displays on the glass panel. Also, at least one of the candidate patterns may be rotated by introduction of a rotation angle parameter in order to better fit an orientation of one or more of the detected local mura defects.

To create the candidate patterns, the range of plausible horizontal and vertical periodicities may be estimated by the user. Alternatively, the cross-correlation of the templates and the potential mura defects, discussed above, may be analyzed for maxima, which are applied to determine the plausible horizontal and vertical periodicities. Also, an exhaustive scan of all possible horizontal and vertical periodicity values may be performed, and the results used to constrain range of plausible horizontal and vertical periodicities in multiple repeated subsequent detection attempts.

The candidate patterns are scanned over a data matrix (array) corresponding to the filtered combined image showing the mura defect templates. Local data at the intersections of the candidate patterns are cut out, and the signal strength in the pixels corresponding to the cut out local data is measured. To allow some margin for error, regions of some finite size corresponding to the tolerated margin of error are cut out around candidate pattern intersections, and the maximum, as opposed to the average, of combined signal within is measured. For a data matrix with many rows and/or columns, points in the data matrix that do not have a chance to contribute to the signal because they happen to be at a position where no data is recorded, should not be penalized. However, if only 2×2 positions are in the data matrix, all positions must be at least partially visible, otherwise there is no defined solution to the localization problem.

Figure 10:
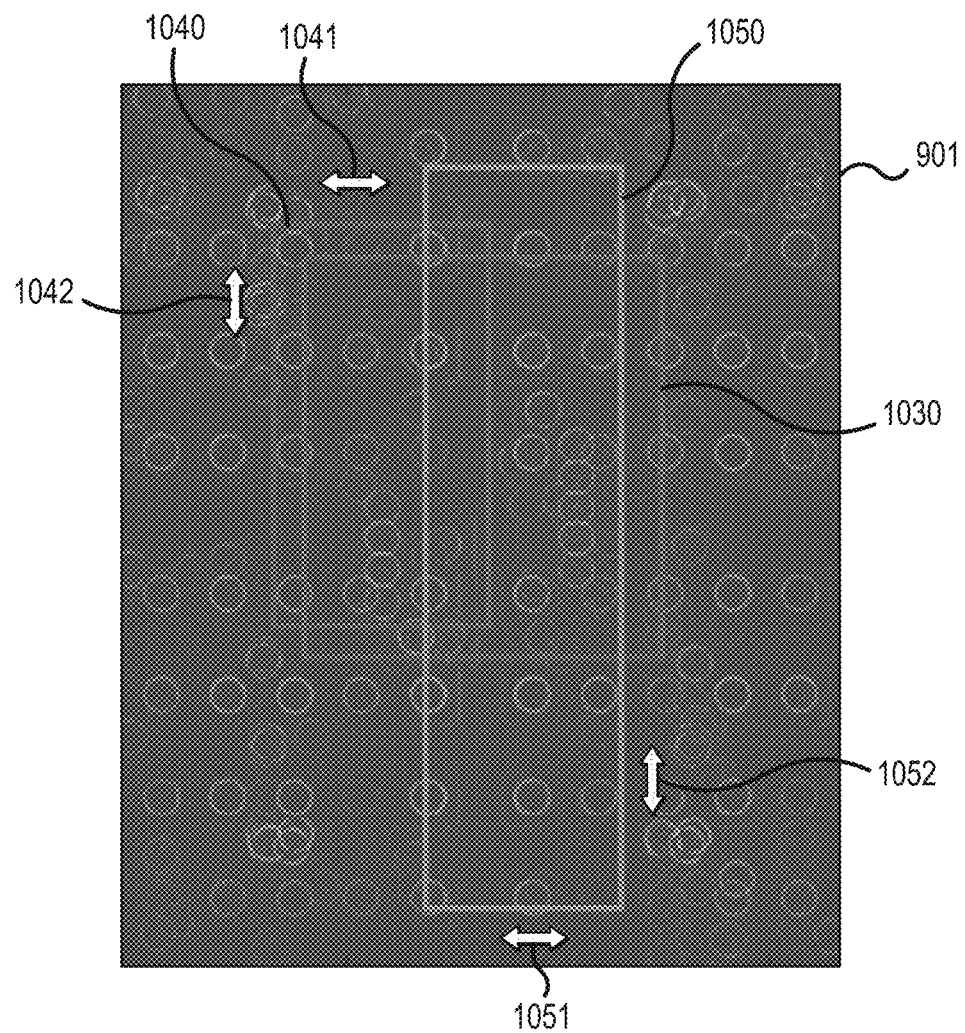
FIG. 10 shows a screen shot of an illustrative filtered combined image showing the ring mura defect templates, along with multiple different candidate patterns, according to a representative embodiment.

FIG. 10 shows a screen shot of an illustrative filtered combined image showing the ring mura defect templates, along with multiple different candidate patterns, according to a representative embodiment. In particular, first, second and third candidate patterns 1030, 1040 and 1050 of different sizes and dimensions are shown on the combined image 901 with the templates corresponding to ring mura defects. (It is understood that candidate patterns of different sizes and dimensions would be similarly applied to the combined image 902 in FIG. 9 with the templates corresponding to spot mura defects, and therefore this discussion equally applies to the combined image 902.) Also, double arrows 1041 and 1042 indicate horizontal and vertical scan offsets of the second candidate pattern 1040, and double arrows 1051 and 1052 indicate horizontal and vertical scan offsets of the third candidate pattern 1050. The first candidate pattern 1030 would likewise have horizontal and vertical scan offsets, although not expressly shown in FIG. 10. The first, second and third candidate patterns 1030, 1040 and 1050 are arranged in the horizontal and vertical directions (i.e., not rotated), although one or more of the first, second and third candidate patterns 1030, 1040 and 1050 may be rotated to better accommodate the pattern of templates corresponding to the ring mura defects. Signals are detected at the corners of the first, second and third candidate patterns 1030, 1040 and 1050, and the signals are part of a total filter response from the combined image 901. As discussed above, regions of some finite size corresponding to the tolerated margin of error are cut out around the intersections of the first, second and third candidate patterns 1030, 1040 and 1050 (e.g., the corners), and the maximum combined signal, as opposed to the average combined signal, is measured within the remainder of the first, second and third candidate patterns 1030, 1040 and 1050. The signal is encoded in the pixel value.

Figure 11:
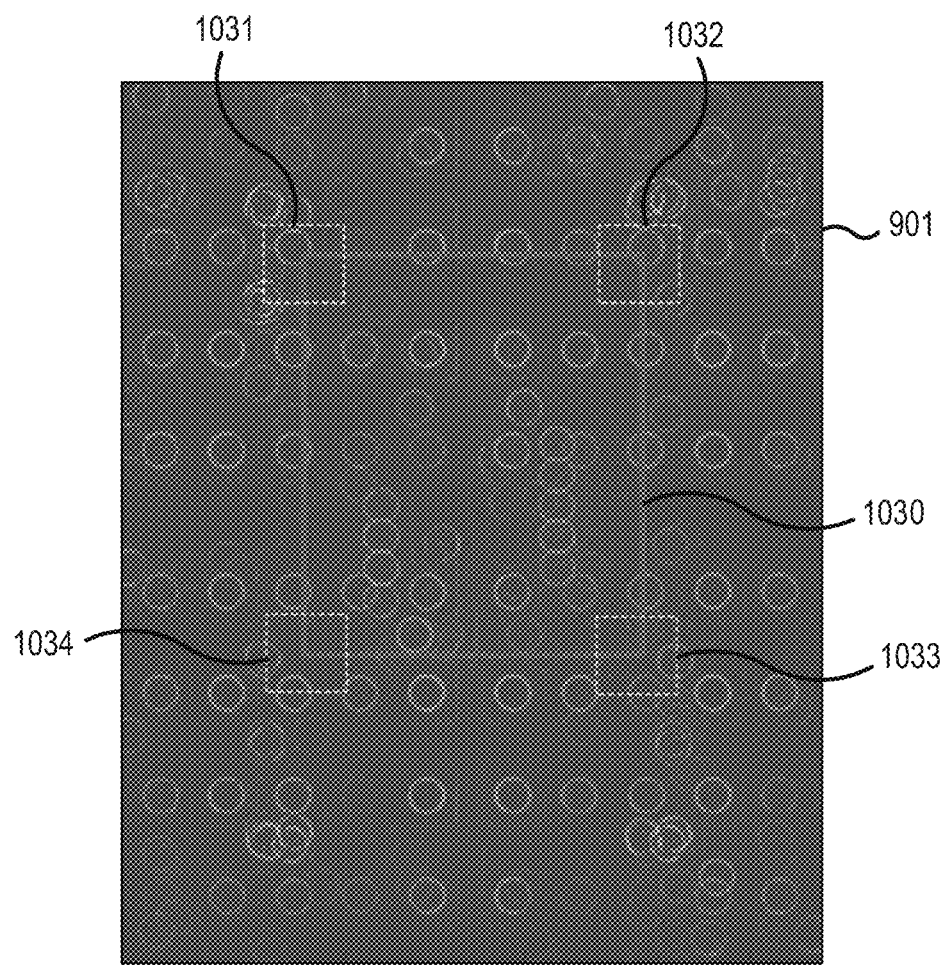
FIG. 11 shows a screen shot of an illustrative filtered combined image showing the ring mura defect templates, along with a candidate pattern having tolerance regions, according to a representative embodiment.

In an embodiment, the signals detected at the corners of the first, second and third candidate patterns 1030, 1040 and 1050 are maximum signals taken within a tolerance region. For example, FIG. 11 shows a screen shot of an illustrative filtered combined image showing the ring mura defect templates, along with a candidate pattern having tolerance regions, according to a representative embodiment. Referring to FIG. 11, tolerance regions are shown on corners of the first candidate pattern 1030, for the sake of convenience, although it is understood the other candidate patterns (e.g., second and third candidate patterns 1040 and 1050) may also include tolerance regions. In particular, at each of the four corners of the first candidate pattern 1030 are tolerance regions 1031, 1032, 1033 and 1034 from which the signals are detected. The tolerance regions 1031, 1032, 1033 and 1034 are not to scale, as actual tolerance reflects uncertainty of the horizontal and/or vertical periodicity, and is therefore would likely be smaller in a scaled portrayal. In an embodiment, each of the tolerance regions 1031, 1032, 1033 and 1034 is centered at a corresponding corner (intersection) of the first candidate pattern 1030. The tolerance regions 1031, 1032, 1033 and 1034 allow fitting of a slightly rotated data matrix without having to rotate the first candidate pattern 1030. This helps speed up the process of creating and selecting candidate patterns, and ultimately detecting mura defects.

In block S214, one of the candidate patterns is selected as a defect detection pattern, where the defect detection pattern is the candidate pattern that most closely resembles the structured pattern of defined geometric shapes of the detected local mura defects. The defect detection pattern may be selected automatically by determining which of the candidate patterns provides the strongest signal of a total filter response from the filtered combined image. For example, selecting the defect detection pattern may include summing a filter response at regularly spaced grid points for each one of the candidate patterns. The candidate pattern that has the highest summed filter response is then selected as the best candidate pattern. The grid points for each candidate pattern mark locations of strong filter signals, and therefore capture the positioning of the detected mura defects.

The selected defect detection pattern may be fine-tuned by measuring median signals at the horizontal and vertical (X, Y) coordinates for each row and each column of pixels in the filtered combined image, e.g., in order to provide robustness to outliers. Optionally, rotation may be determined to provide the positioning of the selected defect detection pattern. For example, rotation may be inferred by a linear fit in polar coordinates. Also optionally, lattice periodicity may be inferred with linear fit, such that rows and columns not visible in the filter combined image may be inferred. In addition, a scan offset may be selected in block S214, where the selected scan offset most closely corresponds to the positioning of the detected local mura defects.

Figure 12:
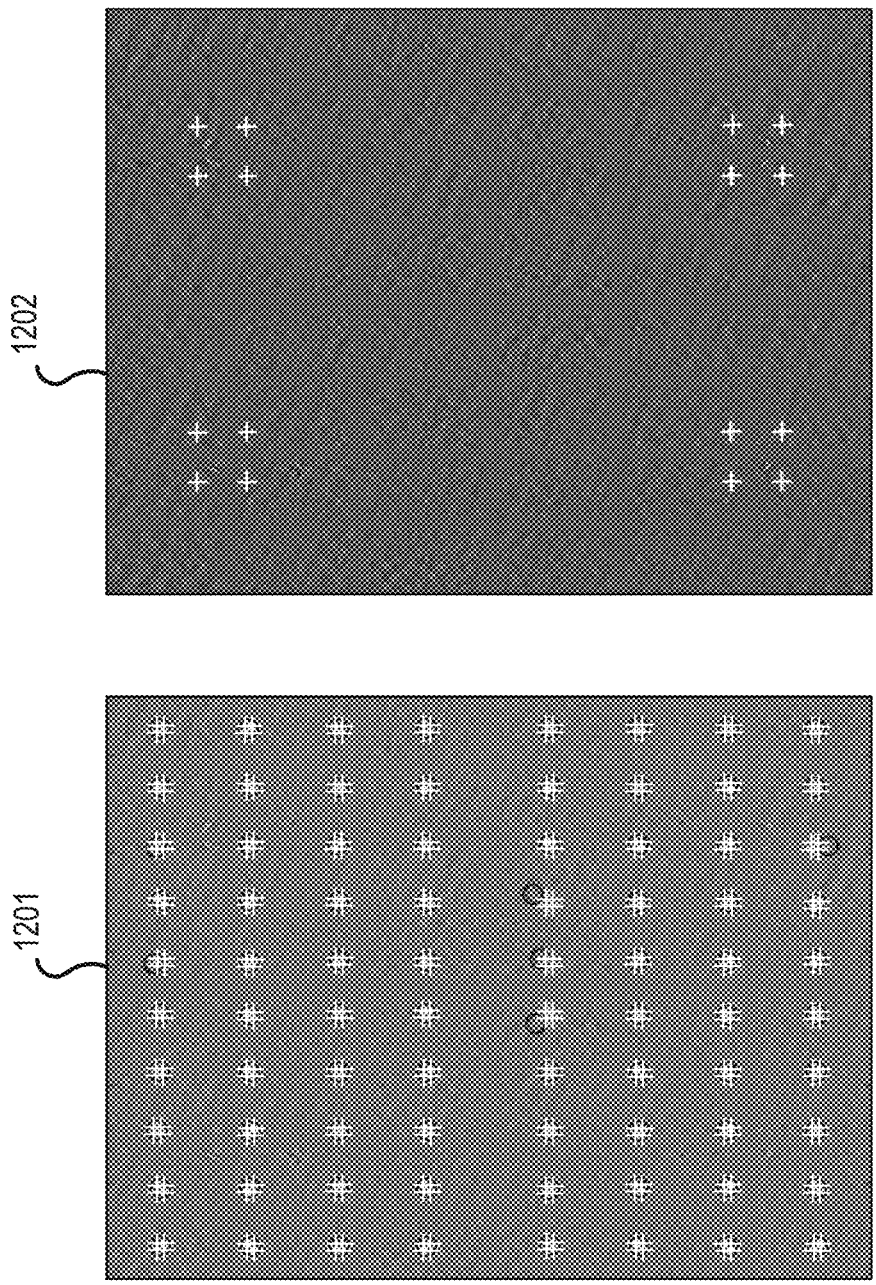
FIG. 12 shows screen shots of illustrative filtered combined images showing selected defect detection patterns, according to a representative embodiment.

FIG. 12 shows screen shots of illustrative filtered combined images showing selected defect detection patterns, according to a representative embodiment. In particular, combined image 1201 shows the selected defect detection pattern for spot mura defects, and combined image 1202 shows the selected defect detection pattern for ring mura defects. In the combined image 1201, the hash marks indicate the selected defect detection pattern for mura spots, and the circles indicate the detections of spot mura defects. Of course, these detections contain some margin of error, so it is assumed that they are arrange in a regular pattern, i.e., that the hash marks to be the actual positions. As shown in FIG. 12, the hash marks substantially align with the actual spot mura defects. In the combined image 1202, there are four sets of hash marks, each of which indicates a selected defect detection pattern for a corresponding ring mura defect. Portions of each ring mura defect are visible in the combined image 1202 surrounded by the selected defect detection pattern.

In block S215, the detected local mura defects are quantified using the (fine-tuned) defect detection pattern. Parameters such as diameter and eccentricity, as well as statistical parameters such as average, median, maximum and minimum signal strength, as well as noise level, and other parameters, can be extracted from the regions marked as mura defects.

In block S216, at least a portion of the defect detection pattern is displayed on a display (e.g., display 130), together with the filtered combined image. The displayed portion of the defect detection pattern shows the positions of the detected local mura defects in the structured pattern of defined geometric shapes. The detected local mura defects may serve a number of purposes. For example, a master panel may be accepted or rejected based on the extent to which local mura defects have been detected. Also, the detected local mura defects may be used to identify the manufacturing equipment that is causing the mura defects, so that the manufacturing equipment can be tuned or adjusted or replaced.

According to various embodiments, mura defects on master panels and/or flat panel displays included therein may be automatically detected, classified and/or quantified. Compared to manual inspection, the automated mura defect detection process, according to various embodiments, results in increased throughput, reduced labor costs and standardized results. The process also provides flexibility, enabling the user to add target defect patterns to detect, as needed. Furthermore, localization and quantification of the defect patterns allows for a graded scoring of panel quality that goes beyond a simple pass/fail assessment. The graded scoring of panel quality may be incorporated into quality assurance determinations, for example, according to which panels may be accepted or rejected based in part on the presence and extent of mura defects. Also, the detected pattern type and localization enables determination of which processing equipment in the manufacturing line is responsible for causing certain mura defects. Accordingly, improvements may be made to the manufacturing line by tuning, adjusting or replacing the equipment responsible for causing the mura defects, as mentioned above, thereby increasing yield.

Factors that may be considered in the graded scoring of panel quality include number, sizes, depths/intensities, locations and/or shapes of the mura defects, respectively. For example, sizes may be determined by measuring area, diameter and/or length of the mura defects, and depths/intensities may be determined by measuring brightness. Generally, panels having larger numbers of larger and more intense defects are scored lower, and vice versa. Locations of the mura defects may be determined based on where on a master panel and/or flat panel display the mura defects appear, as well as whether the mura defects are in a periodic arrangement or isolated. Shapes include circles, lines and dots, for example. The effects of location and size on panel quality may vary for any particular situation or to meet application specific design requirements of various implementations, as would be apparent to one skilled in the art. The locations and shapes may also be indicative of the causes of the mura defects, enabling identification of the equipment in the manufacturing line responsible for the mura defects, respectively, how the equipment may be tuned or adjusted, and ultimately whether the equipment needs to be replaced. The factors may be determined and scored automatically by the processor 112, or manually by a user viewing and/or interfacing with the display 130, discussed above.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of detecting mura defects in a master panel during fabrication, the master panel containing a plurality of flat screen displays, the method comprising:
    preparing a combined image from image data of the master panel;
    enhancing quality of the combined image, wherein enhancing the quality comprises removing artifacts from the combined image;
    filtering the enhanced quality combined image to detect local mura defects, the local mura defects comprising at least one structured pattern of defined geometric shapes;
    applying a plurality of different candidate patterns to the filtered combined image;
    selecting one of the plurality of candidate patterns as a defect detection pattern, the defect detection pattern closest to the structured pattern of defined geometric shapes of the detected local mura defects being selected from among the plurality of candidate patterns; and
    displaying at least a portion of the defect detection pattern on a display, together with the quality-enhanced combined image, to show positions of the detected local mura defects in the structured pattern of defined geometric shapes.

2. The method of claim 1, wherein filtering the enhanced quality combined image to detect local mura defects comprises:
    filtering out relevant spatial frequencies corresponding to length scales of the detected local mura defects to provide a first filtered image; and
    convoluting the first filtered image with a set of templates corresponding to the defined geometric shapes, respectively.

3. The method of claim 1, wherein the defined geometric shapes comprise spots and/or a plurality of rings.

4. A method of detecting mura defects in flat screen displays, prior to separation from a master panel during a fabrication process, the method comprising:
    obtaining a plurality of images of a master panel, and storing image data corresponding to at least some of the plurality of images, wherein the image data comprise pixel signals received from a matrix of pixels on the master panel;
    combining the stored image data of the plurality of images to provide a combined image;
    filtering the combined image to detect mura defects using at least one defect pattern specific template for detecting a structured pattern of defined geometric shapes corresponding to mura defects;
    creating candidate patterns, having differently dimensioned two-dimensional coordinate systems, respectively, that attempt to illustrate positioning of the detected mura defects;
    selecting a defect detection pattern from among the created candidate patterns and a scan offset that most closely corresponds to the positioning of the detected mura defects, the selected defect detection pattern providing a strongest signal of a total filter response from the filtered combined image;
    fine-tuning the selected defect detection pattern;
    quantifying the detected mura defects using the fine-tuned defect detection pattern; and
    performing quality assurance on the master panel based on the quantified detected mura defects.

5. The method of claim 4, wherein each of the candidate patterns comprises horizontal and vertical periodicity of the detected mura defects, and horizontal and vertical scan offset, thereby creating a rectangular pattern.

6. The method of claim 5, wherein at least one of the candidate patterns is rotated by introduction of a rotation angle parameter.

7. The method of claim 4, wherein obtaining the plurality of images of the master panel comprises scanning the master panel using a scan head, wherein electrical signals or optical signals from the scan head connect to the pixels on the master panel, respectively, in a predetermined sequence to provide the pixel signals.

8. The method of claim 4, wherein the master panel comprises a glass substrate.

9. The method of claim 4, wherein combining the stored image data of the plurality of images to provide the combined image comprises:
    down-sampling the plurality of images to reduce storage requirements for storing the image data;
    arranging the down-sampled plurality of images in a two-dimensional pattern, and combining the two-dimensional pattern into a single larger image;
    correcting the down-sampled plurality of images of the single larger image for contrast and background level to provide the combined image, which appears homogeneous; and
    marking in a separate binary matrix regions of the combined image consisting of actual data, as opposed to unknown regions, wherein the binary matrix regions are used to weigh filter responses from filtering the combined image.

10. The method of claim 9, further comprising cleaning up the combined image before filtering the combined image to detect the mura defects, cleaning up the combined image comprising:
 removing measurement artifacts from the stored image data before combining the two-dimensional pattern into the single larger image; and
 suppressing artifacts in individual frames of the single larger image before correcting for contrast and background level.

11. The method of claim 10, wherein suppressing artifacts in individual frames of the single larger image comprises removing local overshoot and/or undershoot of signals in corners of the stored image data corresponding to the at least some of the plurality of images.

12. The method of claim 10, wherein removing the measurement artifacts from the stored image data comprises:
 removing noise originating from electronic amplifier components;
 removing white noise using a low-pass filter; and
 flattening the image by subtracting a local average extracted by convoluting the image with a Gaussian kernel.

13. The method of claim 12, wherein removing the noise originating from electronic amplifier components comprises:
 removing drift by subtraction of a gliding average;
 removing changes in gain by normalizing signal strength;
 removing crosstalk between amplifier channels; and
 removing narrowband noise by applying narrowband spatial frequency filters.

14. The method of claim 4, wherein prior to filtering with the at least one defect pattern specific template, the method further comprising:
 filtering the combined image with a kernel that selects relevant spatial frequencies; and
 compiling a histogram of the filtered combined image, and renormalizing the filtered combined image on a per-pixel signal basis as probability of not being noise by comparing pixel signals of the filtered combined image, at least in part, to the histogram.

15. The method of claim 14, wherein after filtering with the at least one defect pattern specific template, the method further comprising:
 convoluting the renormalized filtered combined image with a set of templates corresponding to the defined geometric shapes;
 weighting a result of the convolution by a number of pixel signals that are actually data, as opposed to pixel signals of zero corresponding to pixels that lie in regions where no image data was acquired; and
 smoothening the weighted result with the kernel to provide a filtered combined image, the smoothing comprising penalizing isolated signals and enforcing signals that match a predetermined feature length scale.

16. The method of claim 15, wherein creating the candidate patterns comprises:
 determining a range of plausible differently dimensioned two-dimensional coordinate systems; and
 scanning the two-dimensional coordinate systems over the smoothened filtered combined image, removing local pixel signals at intersections of each of the two-dimensional coordinate systems, and measuring a combined signal strength in the removed local pixel signals within a tolerance region at each of the intersections of each of the candidate patterns.

17. The method of claim 16, wherein selecting the defect detection pattern from among the created candidate patterns comprises:
 summing a filter response at regularly spaced grid points for each candidate pattern; and
 selecting the candidate pattern having the highest summed filter response as the best candidate pattern,
 wherein the grid points for each candidate pattern mark locations of strong filter signals, thereby capturing the positioning of the detected mura defects.

18. The method of claim 15, wherein the kernel for extraction of the relevant spatial frequencies comprises a simple Gaussian function with width based on visual inspection of the predetermined feature length scale.

19. The method of claim 14, further comprising:
 down-sampling the selected relevant spatial frequencies to reduce processing time.

20. The method of claim 14, wherein the histogram comprises an empirical histogram fitted with a Gaussian distribution, and a difference between the empirical histogram and the Gaussian fit is large for strong signals, and
 wherein a probability of a pixel being background is calculated by comparing the corresponding pixel signal to both the empirical histogram and the Gaussian fit.

\* \* \* \* \*